(12) United States Patent
Smith et al.

(10) Patent No.: US 12,657,880 B2
(45) Date of Patent: Jun. 16, 2026

(54) HIGH RESOLUTION LAND COVER (HRLC)

(71) Applicant: VANTOR INC., Westminster, CO (US)

(72) Inventors: François Garriet Smith, Laurel, MD (US); Evan Marcus Blaisdell, Germantown, MD (US)

(73) Assignee: VANTOR INC., Westminster, CO (US)

( * ) Notice: Subject to any disclaimer, the term of this patent is extended or adjusted under 35 U.S.C. 154(b) by 278 days.

(21) Appl. No.: 18/490,797

(22) Filed: Oct. 20, 2023

(65) Prior Publication Data

US 2025/0131692 A1    Apr. 24, 2025

(51) Int. Cl.
| | |
|---|---|
| *G06V 10/77* | (2022.01) |
| *G06T 7/10* | (2017.01) |
| *G06T 7/35* | (2017.01) |
| *G06V 10/764* | (2022.01) |
| *G06V 20/10* | (2022.01) |
| *G06V 20/13* | (2022.01) |

(52) U.S. Cl.
CPC ............ *G06V 10/7715* (2022.01); *G06T 7/10* (2017.01); *G06T 7/35* (2017.01); *G06V 10/764* (2022.01); *G06V 20/13* (2022.01); *G06V 20/188* (2022.01); *G06T 2207/20081* (2013.01)

(58) Field of Classification Search
None
See application file for complete search history.

(56) References Cited

U.S. PATENT DOCUMENTS 11,037,022 B2 * 6/2021 Kumar ................ G06F 18/2321

2022/0164736 A1 * 5/2022 Johnson ............. G06Q 10/0637
2023/0351732 A1 * 11/2023 Story ................... G06V 10/761
2024/0013531 A1 * 1/2024 Hu ....................... G06V 10/764

OTHER PUBLICATIONS

Sahin et al., "Non-parametric Spatio-temporal Activity Learning from Overhead Imagery," Proc. of SPIE vol. 12096, 1209602, © 2022 SPIE, 0277-786X, doi: 10.1117/12.2626167 (Year: 2022).*
Fendrich et al., "From regional to parcel scale: A high-resolution map of cover crops across Europe combining satellite data with statistical surveys," Science of the Total Environment 873 (2023) 162300, available online Feb. 22, 2023, http://dx.doi.org/10.1016/j.scitotenv.2023.162300 (Year: 2023).*
Lemenkova, "SAGA GIS for Information Extraction on Presence and Conditions of Vegetation of Northern Coast of Iceland Based on the Landsat TM," Acta Biologica Marisiensis, 3(2), 10-21. DOI: 10.2478/abmj-2020-0007, Jan. 7, 2021 (Year: 2021).*

* cited by examiner

*Primary Examiner* — Soo Shin
(74) *Attorney, Agent, or Firm* — Harness, Dickey & Pierce, P.L.C.

(57) ABSTRACT

High Resolution Land Cover (HRLC) may be provided. A first high resolution image of a scene may be received and a plurality of second medium resolution images of the scene taken over a period of time may be received. A segmentation of the first image may then be performed. Next, a plurality of transformations may be performed on the plurality of second images. Then a temporal stack layer for a plurality of temporal statistics for each of the plurality of transformations on the plurality of second images may be created. The temporal stack layer may then be intersected with the segmented first image using a plurality of spatial statistics to produce a plurality of spatio-temporal layers. A Machine Learning (ML) model may be used on the spatio-temporal layers to classify pixels in the first image into respective ones of a plurality of classifications.

18 Claims, 4 Drawing Sheets

HIGH RESOLUTION LAND COVER (HRLC)

TECHNICAL FIELD

The present disclosure relates generally to providing High Resolution Land Cover (HRLC).

BACKGROUND

Satellite images are images of Earth collected by imaging satellites operated by governments and businesses around the world. Satellite imaging companies sell images by licensing them to governments and businesses. Satellite images have many applications in meteorology, oceanography, fishing, agriculture, biodiversity conservation, forestry, landscape, geology, cartography, regional planning, and education. Images may be in visible colors and in other spectra. There are also elevation maps, usually made by radar images. Image interpretation and analysis of satellite imagery may be conducted using software.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
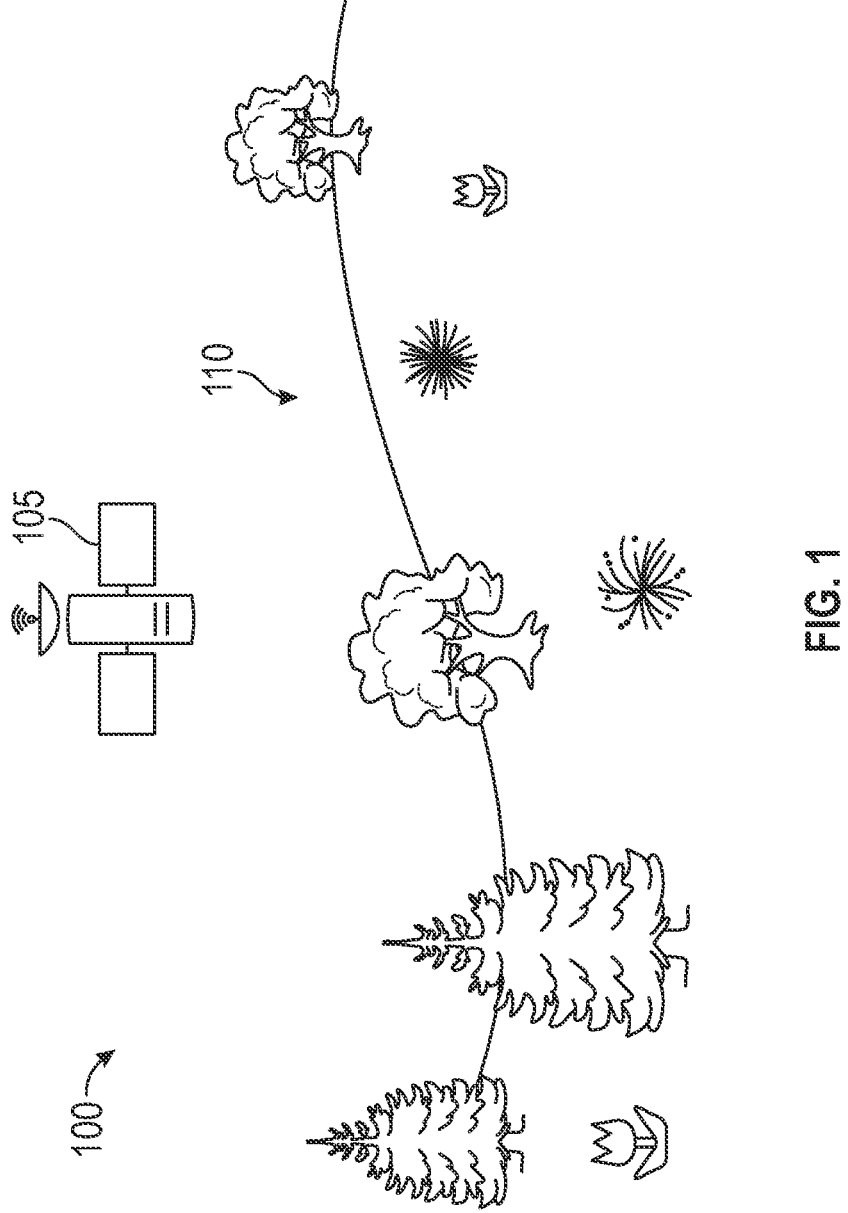
FIG. 1 is a diagram of an operating environment for providing High Resolution Land Cover (HRLC)

High Resolution Land Cover (HRLC) may be provided. A first high resolution image of a scene may be received and a plurality of second medium resolution images of the scene taken over a period of time may be received. A segmentation of the first image may then be performed. Next, a plurality of transformations may be performed on the plurality of second images. Then a temporal stack layer for a plurality of temporal statistics for each of the plurality of transformations on the plurality of second images may be created. The temporal stack layer may then be intersected with the segmented first image using a plurality of spatial statistics to produce a set of spatio-temporal layers. A Machine Learning (ML) model may be used on the spatio-temporal layers and other independent variables to produce a of classification based on the date of the primary high-resolution image.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Land cover may comprise the physical material at the surface of Earth. Land covers include grass, asphalt, trees, bare ground, and water for example. Land cover maps may be tools that provide information about the Earth's land use and cover patterns. They may aid policy development, urban planning, and forest and agricultural monitoring. High Resolution Land Cover (HRLC) may comprise an automated process for producing, for example, 14-class land cover datasets using a high-resolution image, a set of medium-resolution image, and a manually derived training dataset as inputs. HRLC may allow for efficiently and accurately producing, for example, 2 m resolution land cover.

FIG. 1 shows an operating environment 100 for providing High Resolution Land Cover (HRLC). As shown in FIG. 1, operating environment 100 may comprise a satellite 105 and a scene 110. For example, scene 110 may comprise, but is not limited to, deciduous trees, evergreen trees, scrub, grass, bare land, built-up/structures, agriculture dry land, agriculture wet land, wetland, mangrove, water, snow/ice, clouds, and other impervious surface. Satellite 105 may comprise a commercial Earth observation and imaging satellite used or designed for Earth Observation (EO) from orbit, including environmental monitoring, meteorology, cartography, and others. Satellite 105 may collect images in panchromatic and multispectral bands for example. The orbiting altitude of satellite 105 may comprise, but is not limited to, 617 km. Satellite 105 may be used to take images of scene 110 that may be on the surface of the Earth. While FIG. 1 shows one satellite, multiple satellites may be used. Satellite 105 and/or other satellites may be used to take images of scene 110 in various resolutions and at various seasons and times of the year.

Figure 2:
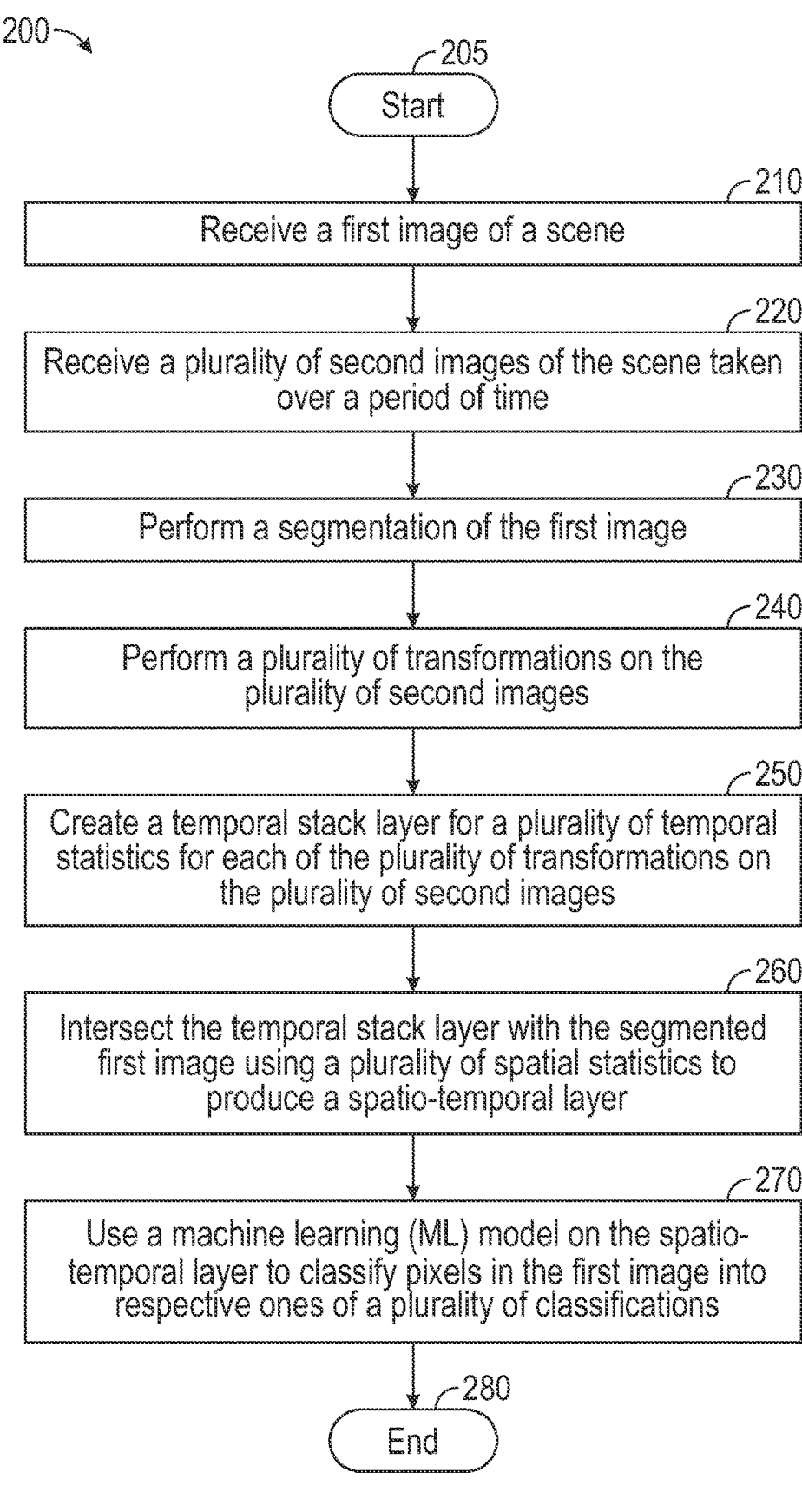
FIG. 2 is a flow chart of a method for providing HRLC.

FIG. 2 is a flow chart setting forth the general stages involved in a method 200 consistent with embodiments of the disclosure for providing High Resolution Land Cover (HRLC). Method 200 may be implemented using a computing device 400 as described in more detail below with respect to FIG. 4. Ways to implement the stages of method 200 will be described in greater detail below.

Consistent with embodiments of the disclosure, HRLC may produce automated land cover products with, for example, many classes (e.g., 14) at different resolutions (e.g., 2 m×2 m resolution). Embodiments of the disclosure may use, but are not limited to, a Random Forest classifier. Also embodiments of the disclosure may use any image as an input target image and the result may be 14 class land cover at the same resolution of the target image. Embodiments of the disclosure may use manual training to train the model and may be automated to produce consistent and useable land cover datasets.

Method 200 may begin at starting block 205 and proceed to stage 210 where computing device 400 may receive a first image of scene 110. For example, the first image may comprise a high resolution image comprising, but not limited to, a resolution of higher than 10 meters/pixel.

From stage 210, where computing device 400 receives the first image of scene 110, method 200 may advance to stage 220 where computing device 400 may receive a plurality of second images of scene 110 taken over a period of time. For example, the resolution of the plurality of second images may comprise a resolution lower than the resolution of the first image. The second images comprising a resolution lower than the resolution of the first image may allow embodiments of the disclosure to increase computing speed without lowering the quality of the classification process. The plurality of second images may comprise, for example, medium resolution images. The medium resolution images may comprise a resolution of lower than 10 meters/pixel. The second images may comprise, but are not limited to, Sentinel-2 images.

The period of time over which the plurality of second images may be taken of scene 110 may comprise, but is not limited to, one to two years. Ones of the plurality of second images may be taken, but not limited to, 6 to 10 times during the period of time. These dates may be spaced out over the period of time and may be evenly spaced out. The dates may be selected to causes ones of the plurality of second images taken of scene 110 to be taken during different seasons of the year.

Once computing device 400 receives the plurality of second images of the scene taken over the period of time in stage 220, method 200 may continue to stage 230 where computing device 400 may perform a segmentation of the first image. For example, the first image may be segmented into a plurality of various polygons. These polygons may be segmented to establish the spatio-temporal variables, and later to intersect with the raw classification at least for some classes in order to reduce noise.

After computing device 400 performs the segmentation of the first image in stage 230, method 200 may proceed to stage 240 where computing device 400 may perform a plurality of transformations on the plurality of second images. For example, these transformations may help characterize pixels of the plurality of second images.

One of the plurality of transformations may comprise a Principal Component Analysis (PCA) transformation. PCA may comprise a technique for analyzing large datasets containing a high number of dimensions/features per observation, increasing the interpretability of data while preserving the maximum amount of information, and enabling the visualization of multidimensional data. PCA may comprise a statistical technique for reducing the dimensionality of a dataset. This may be accomplished by linearly transforming the data into a new coordinate system where the variation in the data may be described with fewer dimensions than the initial data.

Another of the plurality of transformations may comprise a Normalized Difference Vegetation Index (NDVI) transformation. NDVI may comprise a metric for quantifying the health and density of vegetation using sensor data. It may be calculated from spectrometric data at two specific bands: red and near-infrared for example. The spectrometric data may be sourced from remote sensors (e.g., satellites). Another of the plurality of transformations may comprise a Normalized Difference Wetness Index (NDWI) transformation. NDWI may be used to extract water information from images. Compared to NDVI, NDWI may obtain moisture content within the vegetation canopy for example. NDWI may respond to moisture content stress, which may be used for drought monitoring.

Yet another of the plurality of transformations may comprise a Modified Soil-Adjusted Vegetation Index (MSAVI) transformation. MSAVI may minimize the effect of bare soil on the Soil Adjusted Vegetation Index (SAVI). MSAVI may work where other vegetation indices may not (e.g., during seed germination and leaf development stages). For example, MSAVI may be used to monitor seedlings when there is a lot of bare soil in the field thus helping to detect uneven seed growth.

Another of the plurality of transformations may comprise a Tasseled Cap (TCAP) transformation. TCAP may comprise a process to transform spectral information of satellite data into spectral indicators. This transformation may be used in the analysis of vegetation and may, for example, generate three levels of information: i) TCAP band 1 (e.g., brightness, a measurement value for the ground); ii) TCAP band 2 (e.g., greenness, a measured value for the vegetation); and iii) TCAP Band 3 (e.g., wetness, a measured value for interactions of soil and canopy moisture).

Figure 3:
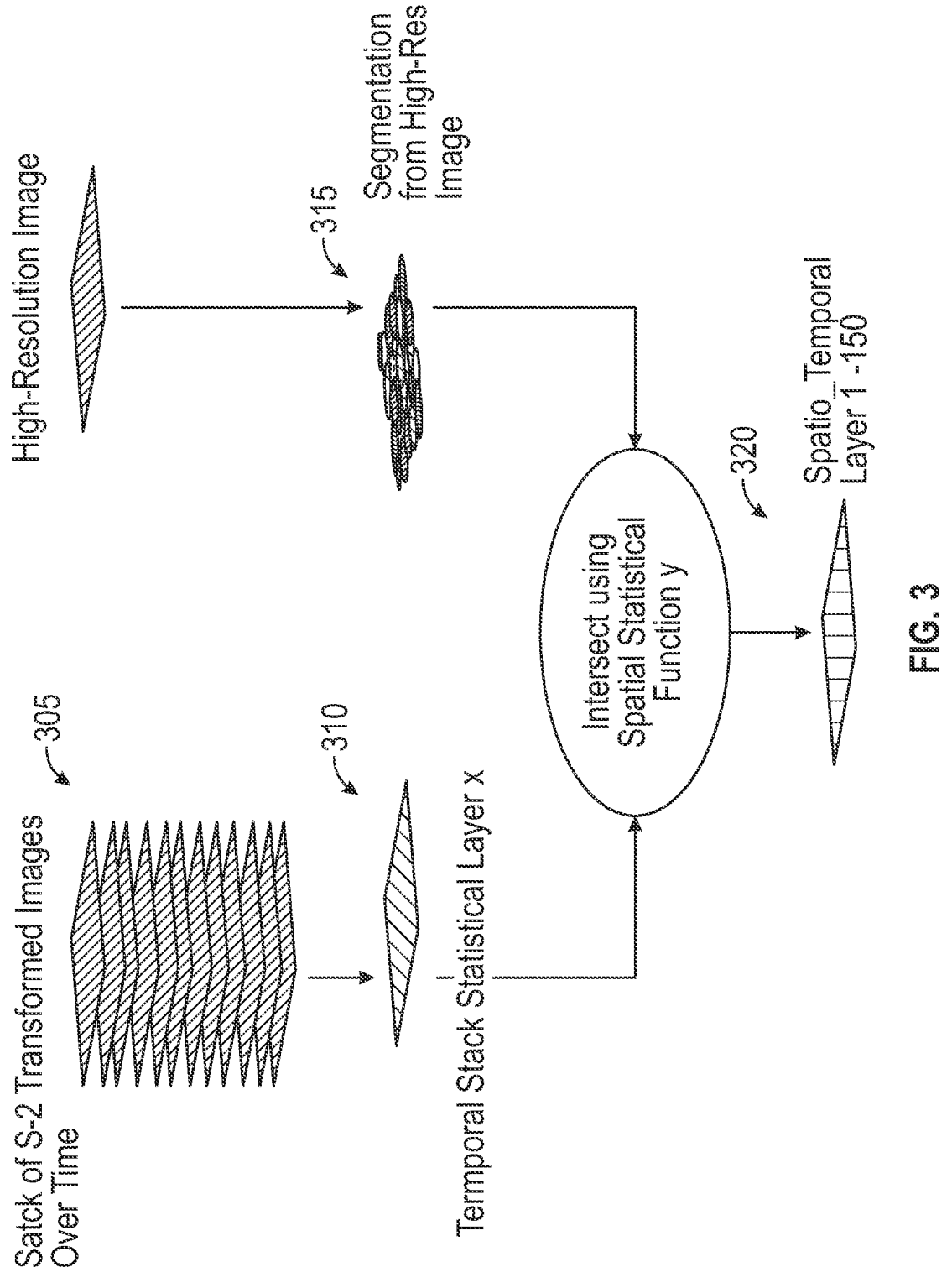
FIG. 3 illustrates a work flow for providing HRLC.

From stage 240, where computing device 400 performs the plurality of transformations on the plurality of second images, method 200 may advance to stage 250 where computing device 400 may create a temporal stack layer for a plurality of temporal statistics for each of the plurality of transformations on the plurality of second images. As illustrated by FIG. 3, on a pixel-by-pixel basis for each of the plurality of transformations on the plurality of second images 305, a temporal stack statistical layer x 310 may be created. For example, six (e.g., x=6) temporal statistics may be used. These temporal statistics may comprise, but are not limited to, minimum, maximum, mean, median, standard deviation, and range.

Once computing device 400 creates the temporal stack layer for the plurality of temporal statistics for each of the plurality of transformations on the plurality of second images in stage 250, method 200 may continue to stage 260 where computing device 400 may intersect the temporal stack layer 310 with the segmented first image 315 using a plurality of spatial statistics to produce a spatio-temporal layer 320. For example, five (e.g., y=5) spatial statistics may be used. These spatial statistics may comprise, but are not limited to, minimum, maximum, mean, standard deviation, and range. In this example, the process may run iteratively for each temporal statistic (x) and each spatial statistic (y) to produce 30 layers for each footprint. Five different transformations (e.g., MSAVI, NDWI, TCAP band1, TCAP band 2, and TCAP band 3) of the plurality of second images, for example, may be stacked. This may produce, in this example, 150 layers (i.e., 6*5*5=150) for spatio-temporal layer 320.

After computing device 400 intersects the temporal stack layer with the segmented first image using a plurality of spatial statistics to produce the spatio-temporal layers which become part of the set of independent variables for a Machine Learning (ML) model (i.e., classifier) in stage 260, method 200 may proceed to stage 270 where computing device 400 may use the ML model to initially classify pixels that have been grouped into segments in the first image into respective ones of a plurality of classifications. As stated above, the first image may be segmented into a plurality of various polygons. The ML model may be used on the spatio-temporal layer to classify segments (e.g., the polygons) in the first image into respective ones of a plurality of classifications. Embodiments of the disclosure may initially classify pixels that have been grouped into segments, therefore it may be a pixel-based classification even though embodiments may intersect it with segments. The plurality of classifications may comprise, but are not limited to, deciduous trees, evergreen trees, scrub, grass, bare, built-up/structures, agriculture dry, agriculture wet, wetland, mangrove, water, snow/ice, clouds, and other impervious surface. Next, after the ML classification, a Post-Classification Ruleset PCR may be used to refine the raw ML classification output. Once computing device 400 uses the ML model to initially classify pixels that have been grouped into segments and the PCR is used in stage 270, method 200 may then end at stage 280.

Figure 4:
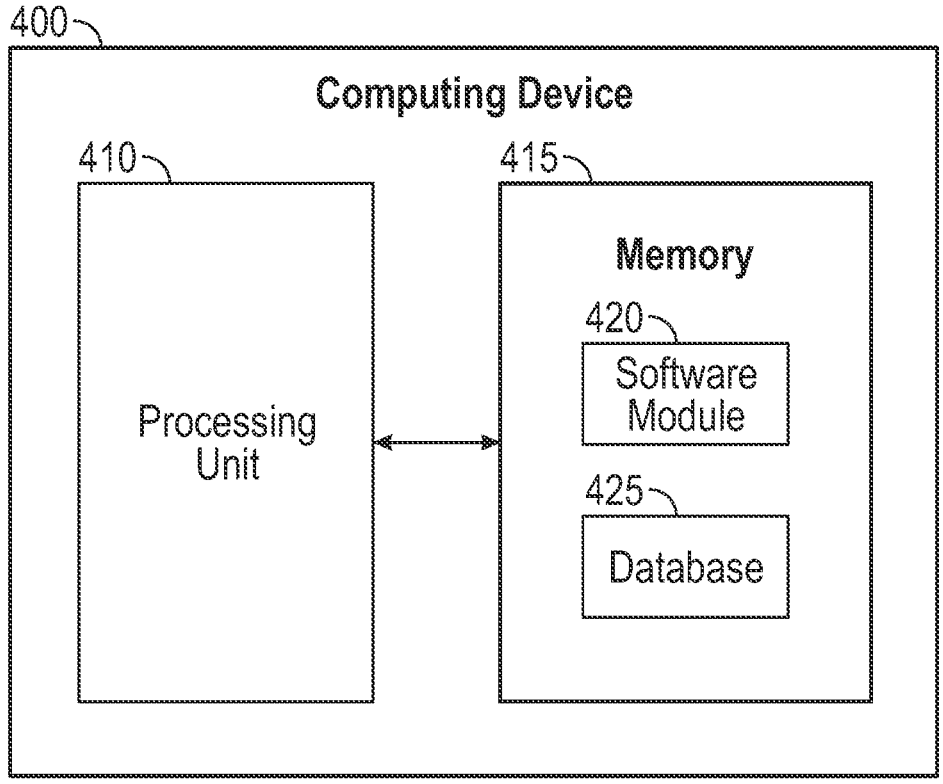
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing High Resolution Land Cover (HRLC) as described above with respect to FIG. 2. Computing device 400, for example, may be deployed in in satellite 105. Notwithstanding, computing device 400 may be deployed anywhere and the image data may be transmitted from satellite 105 to a network, for example, and then sent to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the elements illustrated in FIG. 4 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving a first image of a scene;

receiving a plurality of second images of the scene taken over a period of time;

performing, by a computing device, a segmentation of the first image;

performing, by the computing device, a plurality of transformations on the plurality of second images;

creating, by the computing device, a temporal stack layer for a plurality of temporal statistics for each of the plurality of transformations on the plurality of second images;

intersecting, by the computing device, the temporal stack layer with the segmented first image using a plurality of spatial statistics, relative to segments of the segmented first image, to produce a plurality of spatio-temporal layers; and using, by the computing device, a Machine Learning (ML) model on the plurality of spatio-temporal layers to classify pixels of the first image into respective ones of a plurality of classifications.

2. The method of claim 1, wherein one of the plurality of transformations comprises a Principal Component Analysis (PCA) transformation.

3. The method of claim 1, wherein one of the plurality of transformations comprises a Normalized Difference Vegetation Index (NDVI) transformation.

4. The method of claim 1, wherein one of the plurality of transformations comprises a Normalized Difference Wetness Index (NDWI) transformation.

5. The method of claim 1, wherein one of the plurality of transformations comprises a Modified Soil-Adjusted Vegetation Index (MSAVI) transformation.

6. The method of claim 1, wherein one of the plurality of transformations comprises a Tasseled Cap band 1 transformation.

7. The method of claim 1, wherein one of the plurality of transformations comprises a Tasseled Cap band 2 transformation.

8. The method of claim 1, wherein one of the plurality of transformations comprises a Tasseled Cap band 3 transformation.

9. The method of claim 1, wherein the plurality of temporal statistics comprise at least one of minimum, maximum, mean, median, standard deviation, and range.

10. The method of claim 1, wherein the plurality of spatial statistics comprise at least one of minimum, maximum, mean, standard deviation, and range.

11. The method of claim 1, wherein the plurality of classifications comprise at least one of deciduous trees, evergreen trees, scrub, grass, bare, built-up/structures, agriculture dry, agriculture wet, wetland, mangrove, water, snow/ice, clouds, and other impervious surface.

12. The method of claim 1, wherein the first image comprises a high resolution image, which includes a resolution of higher than 10 meters/pixel.

13. The method of claim 1, wherein the plurality of second images comprise medium resolution images, which includes a resolution of lower than 10 meters/pixel.

8

14. A system comprising:

a memory storage; and a processing unit coupled to the memory storage, wherein the processing unit is operative to:

receive a first image of a scene;

receive a plurality of second images of the scene taken over a period of time;

perform a segmentation of the first image;

perform a plurality of transformations on the plurality of second images;

create a temporal stack layer for a plurality of temporal statistics for each of the plurality of transformations on the plurality of second images;

intersect the temporal stack layer with the segmented first image using a plurality of spatial statistics, relative to segments of the segmented first image, to produce a plurality of spatio-temporal layers; and use a Machine Learning (ML) model on the plurality of spatio-temporal layers to classify pixels of the first image into respective ones of a plurality of classifications.

15. The system of claim 14, wherein the plurality of transformations include multiple of: a Principal Component Analysis (PCA) transformation, a Normalized Difference Vegetation Index (NDVI) transformation, a Normalized Difference Wetness Index (NDWI) transformation, a Modified Soil-Adjusted Vegetation Index (MSAVI) transformation, a Tasseled Cap band 1 transformation, a Tasseled Cap band 2 transformation, and/or a Tasseled Cap band 3 transformation.

16. The system of claim 14, wherein the plurality of classifications comprise at least one of deciduous trees, evergreen trees, scrub, grass, bare, built-up/structures, agriculture dry, agriculture wet, wetland, mangrove, water, snow/ice, clouds, and other impervious surface.

17. A non-transitory computer-readable medium that stores a set of instructions which when executed perform a method executed by the set of instructions comprising:

receiving a first image of a scene;

receiving a plurality of second images of the scene taken over a period of time;

performing a segmentation of the first image;

performing a plurality of transformations on the plurality of second images;

creating a temporal stack layer for a plurality of temporal statistics for each of the plurality of transformations on the plurality of second images;

intersecting the temporal stack layer with the segmented first image using a plurality of spatial statistics, relative to segments of the segmented first image, to produce a plurality of spatio-temporal layers; and using a Machine Learning (ML) model on the plurality of spatio-temporal layers to classify pixels of the first image into respective ones of a plurality of classifications.

18. The non-transitory computer-readable medium of claim 17, wherein the first image comprises a high resolution image and wherein the plurality of second images comprise medium resolution images.

* * * * *